(12) United States Patent
Shimazu et al.

(10) Patent No.: US 9,074,827 B2
(45) Date of Patent: Jul. 7, 2015

(54) HEAT EXCHANGER HEAT-UTILIZATION DEVICE AND METHOD OF MANUFACTURING THE SAME

(75) Inventors: Takashi Shimazu, Nagoya (JP); Hiroyuki Mitsui, Nagoya (JP); Hideo Sobukawa, Nisshin (JP); Yasuo Takada, Nagoya (JP); Yoshiaki Fukushima, Aichi-gun (JP)

(73) Assignee: KABUSHIKI KAISHA TOYOTA CHUO KENKYUSHO, Aichi-gun (JP)

( * ) Notice: Subject to any disclaimer, the term of this patent is extended or adjusted under 35 U.S.C. 154(b) by 1044 days.

(21) Appl. No.: 12/743,272

(22) PCT Filed: Nov. 27, 2008

(86) PCT No.: PCT/JP2008/071553
§ 371 (c)(1),
(2), (4) Date: May 17, 2010

(87) PCT Pub. No.: WO2009/069701
PCT Pub. Date: Jun. 4, 2009

(65) Prior Publication Data
US 2010/0252248 A1 Oct. 7, 2010

(30) Foreign Application Priority Data
Nov. 30, 2007 (JP) .................. 2007-311783

(51) Int. Cl.
*F23L 15/02* (2006.01)
*F28D 17/00* (2006.01)
(Continued)

(52) U.S. Cl.
CPC ............ *F28D 20/003* (2013.01); *F28D 7/0008* (2013.01); *F28D 20/025* (2013.01);
(Continued)

(58) Field of Classification Search
CPC ......... F28D 7/0008; F28D 20/025; F28F 7/02
USPC ............ 165/10, 104.12, 104.15, 185, 9.1–9.4
See application file for complete search history.

(56) References Cited

U.S. PATENT DOCUMENTS 2,566,117 A * 8/1951 Christie, Jr. et al. .......... 501/130
2,624,556 A * 1/1953 Kistler .......................... 165/185
(Continued)

FOREIGN PATENT DOCUMENTS

JP    A-62-120215       6/1987
JP    62-213689 A *     9/1987    .............. F28D 20/00
(Continued)

OTHER PUBLICATIONS

Apr. 19, 2011 International Search Report issued in International Patent Application No. PCT/JP2011/057248 (with translation).
(Continued)

*Primary Examiner* — M. Alexandra Elve
*Assistant Examiner* — Joel Attey
(74) *Attorney, Agent, or Firm* — Oliff PLC

(57) ABSTRACT

A heat exchanger heat-utilization device is obtained that can efficiently store heat and dissipate heat in or from a chemical thermal storage medium, and a manufacturing method of the heat exchanger heat-utilization device. A heat exchanger heat-utilization device includes: chemical thermal storage medium composite molded formed by organizing chemical thermal storage medium particles into a porous structural body having flow channels; and a heat exchanger body. The heat exchanger body has thermal storage medium containing portions in which the chemical thermal storage medium composite molded bodies are accommodated, and fluid flow channels that are partitioned from the thermal storage medium containing portions by partition walls and through which a heat exchange medium flows for heat exchange with the chemical thermal storage medium composite molded bodies.

24 Claims, 4 Drawing Sheets

(51) Int. Cl.

| | | |
|---|---|---|
| *F28D 19/00* | (2006.01) | |
| *F28F 7/00* | (2006.01) | |
| *F28D 15/00* | (2006.01) | |
| *F28D 20/00* | (2006.01) | |
| *C04B 33/02* | (2006.01) | |
| *C04B 35/20* | (2006.01) | |
| *C04B 38/00* | (2006.01) | |
| *F28F 7/02* | (2006.01) | |
| *F28D 7/00* | (2006.01) | |
| *F28D 20/02* | (2006.01) | |
| *C04B 103/00* | (2006.01) | |

(52) U.S. Cl.
CPC ............... *C04B 33/02* (2013.01); *C04B 35/20* (2013.01); *C04B 38/0003* (2013.01); *C04B 2103/0071* (2013.01); *C04B 2235/3208* (2013.01); *C04B 2235/5232* (2013.01); *C04B 2235/526* (2013.01); *C04B 2235/5264* (2013.01); *C04B 2235/6021* (2013.01); *C04B 2235/95* (2013.01); *F28F 7/02* (2013.01); *Y02E 60/142* (2013.01)

(56) References Cited

U.S. PATENT DOCUMENTS

| | | | | |
|---|---|---|---|---|
| 2,839,286 | A * | 6/1958 | Poth | 165/9.3 |
| 3,548,764 | A * | 12/1970 | Di Donato et al. | 110/323 |
| 4,108,733 | A * | 8/1978 | Gerber | 202/267.2 |
| 4,143,704 | A * | 3/1979 | Kandakov et al. | 165/9.2 |
| 4,265,845 | A * | 5/1981 | Eschner | 264/648 |
| 4,303,448 | A * | 12/1981 | Palmour et al. | 501/129 |
| 4,789,585 | A * | 12/1988 | Saito et al. | 428/185 |
| 5,416,057 | A * | 5/1995 | Lipp et al. | 502/439 |
| 5,488,021 | A * | 1/1996 | DeLiso et al. | 502/63 |
| 5,503,222 | A * | 4/1996 | Dunne | 165/104.12 |
| 5,755,569 | A * | 5/1998 | Berg et al. | 432/181 |
| 5,980,849 | A * | 11/1999 | Ogata et al. | 423/332 |
| 6,322,356 | B1 * | 11/2001 | Gupta et al. | 432/179 |
| 6,389,776 | B1 * | 5/2002 | Bremont et al. | 52/606 |
| 6,820,681 | B2 * | 11/2004 | Ohgami et al. | 165/10 |
| 6,880,619 | B1 * | 4/2005 | Suzukawa et al. | 165/10 |
| 2006/0192326 | A1 * | 8/2006 | Matsunaga et al. | 264/670 |
| 2011/0139404 | A1 * | 6/2011 | Reddy et al. | 165/104.15 |

FOREIGN PATENT DOCUMENTS

| | | | | |
|---|---|---|---|---|
| JP | A-62-213689 | | 9/1987 | |
| JP | A-1-225686 | | 9/1989 | |
| JP | 5-71887 A | * | 3/1993 | ............. F28B 17/08 |
| JP | A-5-71887 | | 3/1993 | |
| JP | A-5-223478 | | 8/1993 | |
| JP | 6-55066 | * | 1/1994 | |
| JP | U-6-55066 | | 7/1994 | |
| JP | B2-6-80394 | | 10/1994 | |
| JP | B2-6-80395 | | 10/1994 | |
| JP | A-7-332788 | | 12/1995 | |
| JP | A-2004-3832 | | 1/2004 | |
| JP | A-2004-269560 | | 9/2004 | |
| JP | 2005-134101 A | * | 5/2005 | ............. F28D 20/00 |
| JP | A-2005-134101 | | 5/2005 | |
| JP | A-2009-132844 | | 6/2009 | |
| JP | A-2009-133588 | | 6/2009 | |
| JP | A-2009-149837 | | 7/2009 | |
| JP | A-2009-149838 | | 7/2009 | |
| JP | A-2009-221289 | | 10/2009 | |
| JP | A-2009-227773 | | 10/2009 | |
| JP | A-2009-256520 | | 11/2009 | |
| WO | WO 2009/069701 A1 | | 6/2009 | |

OTHER PUBLICATIONS

Filed Sep. 24, 2012, U.S. Appl. No. 13/636,949, Masashi Hara et al.
International Search Report issued on Mar. 3, 2009 in International Application No. PCT/JP2008/071553 (with translation).
Written Opinion of the International Searching Authority dated Mar. 3, 2009 in International Patent Application No. PCT/JP2008/071553.

* cited by examiner

//www.w3.org/1999/xhtml">
HEAT EXCHANGER HEAT-UTILIZATION DEVICE AND METHOD OF MANUFACTURING THE SAME

TECHNICAL FIELD

The present invention relates to a heat exchanger heat-utilization device configured including a chemical thermal storage medium molded body molded from a chemical thermal storage medium, and to a manufacturing method of the same.

RELATED ART

A technique is known for obtaining quick lime that is formed with plural pores from the surface towards the inside, by heating crystalline limestone with a particle size in the range of 0.3 mm to 4 mm in a range of from 850° C. to 1100° C. for a specific duration, and afterwards heating the limestone in a range of from 500° C. to 600° C. for a specific duration (see, for example, Japanese Patent Application Laid-Open (JP-A) No. 1-225686). Furthermore, a technique is known of packing capsules, containing particles of chemical thermal storage medium occupying 10 to 60% by volume of the internal space therein, into reaction vessel or reaction tower (see, for example, JP-A No. 6-80395 and JP-A No. 6-80394). Furthermore, chemical heat storage refrigeration equipment is known that includes an evaporator, having plural evaporating dishes provided with over-flow pipes, a refrigerant liquid reflux device, a condenser, and an absorbent vessel, and connecting pipes for connecting these together (see, for example, JP-A No. 7-332788).

DISCLOSURE OF THE INVENTION

Problem to be Solved by the Invention

When particles of quick lime, themselves formed with pores, are used unmodified as a chemical thermal storage medium, as described in JP-A No. 1-225686, a hydration reaction and a dehydration reaction are repeatedly carried out during operation. Therefore, the particles of chemical thermal storage medium abrade against the other particles due to repeated volumetric expansion and contraction, with this leading to pulverization, and there is the problem that the reactivity falls off as a heat storage system. In the configurations of JP-A No. 6-80395 and JP-A No. 6-80394, due to the increase in heat transfer resistance and complication of the heat transfer path due to the use of capsules, there is the problem that heat from exothermic reaction of the chemical thermal storage medium cannot be extracted with good efficiency, and furthermore, heat for the heat storage reaction cannot be supplied with good efficiency. However, in the configuration of JP-A No. 7-332788, whereas refrigerant evaporation surface area can be secured in the evaporator by employing plural evaporating dishes, the heat exchange surface area with the heat exchange medium is small, with this being the cause of inadequate heat transfer (limitation).

The present invention is made in consideration of the above circumstances, and an objective thereof is to obtain a heat exchanger heat-utilization device that can perform efficient heat exchange (heat storage and heat dissipation) with a chemical thermal storage medium, and a manufacturing method of such a heat exchanger heat-utilization device.

Method of Solving the Problem

The heat exchanger heat-utilization device of a first aspect of the present invention comprises: a chemical thermal storage medium molded body molded from particles of a chemical thermal storage medium, and formed with a flow channel for supplying a reactant to within the chemical thermal storage medium molded body or for discharging a reaction product; and a heat exchanger structural body, including a thermal storage medium containing portion in which the chemical thermal storage medium molded body is accommodated, and a heat exchange medium flow channel portion that is partitioned from the thermal storage medium containing portion inside by a partitioning body and the heat exchange medium flow channel portion allows a heat exchange medium to flow through, for heat exchange with the chemical thermal storage medium molded body through the partitioning body.

According to the above aspect, due to the chemical thermal storage medium molded body being molded from particles of chemical thermal storage medium, as a whole there are gaps (diffusion paths) formed between the particles (chemical thermal storage medium), and a porous structural body is formed having a specific overall shape. In the chemical thermal storage medium molded body, since a flow channel is formed for introducing a reactant for heat storage or heat dissipation, or for discharging a reaction product generated by heat storage or by heat dissipation, a movement flow channel for these reactants or reaction products is structurally secured. Due thereto, in the chemical thermal storage medium molded body of the present heat exchanger heat-utilization device, introduction of reactant through this flow channel, diffusion of reactant and reaction product through pores of the porous structural body, and discharge of reaction product through the flow channel is achieved, and there is good reactivity for heat storage and heat dissipation. However, since this flow channel is formed internally within the chemical thermal storage medium molded body, it does not impede the heat transfer ability of the chemical thermal storage medium molded body.

In the present heat exchanger heat-utilization device, since heat is stored in the chemical thermal storage medium molded body, or heat of the chemical thermal storage medium molded body is extracted, using heat exchange with the heat exchange medium, heat exchange for heat storage and/or heat dissipation, in at least one of the heat storage reaction or the heat dissipation reaction, can be performed by heat exchange with the heat exchange medium that is external to the thermal storage medium containing portion. Therefore, during reaction there is no impediment to the movement of the reactant or the reaction product due to mixing with the heat exchange medium flowing in the thermal storage medium containing portion, or the like. Hence, movement speed of the reactant or reaction product is secured, and the reactivity for heat storage or heat dissipation is even better. Furthermore, by maintaining a high water vapor pressure for supply/discharge during hydration and dehydration reactions, a high reaction rate can be secured. Furthermore, since the chemical thermal storage medium molded body is adhered to the partitioning body of the heat exchange structural body, there is good heat exchange capability between the chemical thermal storage medium molded body and the heat exchange medium flowing in the heat exchange medium flow channel.

In this manner, in the heat exchanger heat-utilization device according to the above aspect, efficient heat storage and heat dissipation can be achieved to and from the chemical thermal storage medium.

In the above aspect, configuration may be made in which the flow channel is formed inside the thermal storage medium containing portion, with one fluid flow direction end opening at the surface of the chemical thermal storage medium molded body.

According to the above aspect, it is a structure in which the flow channel opens at an end of the chemical thermal storage medium molded body, an end in the reactant or reaction product flow direction (and the flow channel may pass therethrough), good supply of reactant and discharge of reaction product can be performed. Furthermore, heat storage and heat dissipation reactions are readily controlled through such reactant supply and reaction product discharge.

In the above aspects, configuration may be made with the chemical thermal storage medium molded body having plural of the flow channels.

According to the above aspect, due to plural of the flow channels being formed, the diffusion paths to each section of the chemical thermal storage medium molded body increase, and the degrees of freedom for selection of dimensions and shape of the chemical thermal storage medium molded body are increased.

In the above aspect, configuration may be made with chemical thermal storage medium molded body adhered to an inner face of the thermal storage medium containing portion due to being fired in an inserted state in the thermal storage medium containing portion of the heat exchanger structural body.

According to the above aspect, the chemical thermal storage medium molded body for firing is in an inserted state in the thermal storage medium containing portion prior to firing, and therefore the chemical thermal storage medium molded body (an outer face thereof) closely conforms to an inner face of the thermal storage medium containing portion, namely, of the partitioning body, and the adherence at these interfaces is high. Due thereto, the heat exchange efficiency between the chemical thermal storage medium molded body and the heat exchange medium, through the partitioning body, is even higher.

In the above aspect, configuration may be made with the chemical thermal storage medium molded body configured including a clay mineral that disperses and holds the particles of chemical thermal storage medium.

According to the above aspect, since the chemical thermal storage medium is dispersed and held in a porous skeleton of clay mineral, the strength as the above porous structural body is high, and the structure is readily stabilized and maintained as a porous structural body. Furthermore, the adherence of the chemical thermal storage medium molded body to the partitioning body is raised.

In the above aspect, configuration may be made with a clay mineral having a layered ribbon structure employed as the clay mineral.

According to the above aspect, due to the clay mineral being porous and having the fibrous state of a layered ribbon structure with a large relative surface area, due to the fibrous nature and plasticity thereof, the particles of chemical thermal storage medium can be successfully organized and structured.

In the above aspect, configuration may be made with sepiolite or palygorskite employed as the clay mineral having a layered ribbon structure.

According to the above aspect, since at least a portion of the clay mineral is sepiolite or palygorskite (attapulgite) having a layered ribbon structure, due to the fibrous nature and plasticity thereof, the particles of the chemical thermal storage medium can be successfully organized and structured.

In the above aspect, configuration may be made with bentonite employed as the clay mineral.

According to the above aspect, due to bentonite being employed, which is a clay mineral with strong binding force, by utilizing the binding force, the particles of chemical thermal storage medium can be successfully organized and structured.

In the above aspect, configuration may be made with the clay mineral formed as a fine fibrous state, finer than the particle size of the chemical thermal storage medium.

According to the above aspect, due to the clay mineral being formed as a fibrous state, having fine fiber diameters, it is possible to organize and structure the particles of chemical thermal storage medium using a small amount of clay mineral. Due thereto, the occupancy ratio of the chemical thermal storage medium, per unit weight and unit volume in the chemical thermal storage medium molded body, can be made larger.

In the above aspect, configuration may be made with the chemical thermal storage medium having fine cracks therein.

According to the above aspect, due to the large relative surface area of the chemical thermal storage medium having fine cracks therein, an increase reaction rate in the heat storage and heat dissipation reactions is exhibited. The efficiency of heat storage and heat dissipation can thereby be raised.

In the above aspect, configuration may be made with a hydration reaction chemical thermal storage medium employed as the chemical thermal storage medium, absorbing heat during a dehydration reaction and dissipating heat during a hydration reaction.

According to the above aspect, while the hydration reaction chemical thermal storage medium undertakes repeated volumetric expansion and contraction during hydration reaction and dehydration (reverse-hydration) reaction, since the chemical thermal storage medium is organized and formed with gaps in a structure that uses a clay mineral, pulverization of the chemical thermal storage medium can be effectively suppressed or prevented.

In the above aspect, configuration may be made with a hydration reaction chemical thermal storage medium employed, oxidizing during a dehydration reaction and hydroxylating during a hydration reaction.

According to the above aspect, while the hydration reaction chemical thermal storage medium undertakes repeated volumetric expansion and contraction during hydration reaction and dehydration (reverse-hydration) reaction, since the chemical thermal storage medium is organized and formed with gaps in a structure that uses a clay mineral, pulverization of the chemical thermal storage medium can be effectively suppressed or prevented.

In the above aspect, configuration may be made with the hydration reaction chemical thermal storage medium being an inorganic compound.

According to the above aspect, due to an inorganic compound being employed as the chemical thermal storage medium, the material stability to heat storage and heat dissipation reactions (hydration and dehydration) is high. Therefore, a stable heat storage effect can be obtained over a long duration.

In the above aspect, configuration may be made with the inorganic compound being an alkali earth metal compound.

According to the above aspect, due to employing an alkali earth metal compound (hydroxide), or in other words, due to employing a material with low environmental impact, safety can be readily secured, including during production, use, and recycling. Furthermore, in the configuration in which sepiolite is employed as the clay mineral, since glassification is promoted due to reaction of the hydroxide alkaline earth metal compound and the clay mineral (in particular, the above-described clay mineral), this contributes to an increase in the strength of the porous structural body.

In the above aspect, configuration may be made with the chemical thermal storage medium molded body being formed by mixing and kneading the particles of the hydration reaction chemical thermal storage medium with sepiolite as the clay mineral, molding into a specific shape, and firing the resultant at a temperature of 350° C. to 500° C.

According to the above aspect, due to firing the molded body resulting from mixing and kneading the hydration reaction chemical thermal storage medium with sepiolite, the sepiolite is sintered, configuring the porous structural body. By firing the inorganic compound of the hydration reaction chemical thermal storage medium at a temperature of 350° C. to 500° C., micro-cracks occur, and the relative surface area of the hydration reaction chemical thermal storage medium becomes larger. This large relative surface area contributes to raising the reaction rate in the heat storage and heat dissipation reactions, and the efficiency of heat storage and heat dissipation can be raised in the present chemical thermal storage medium molded body.

Furthermore, since the sintering temperature of sepiolite is 350° C. to 400° C., sintering the sepiolite progresses at the same time as the generation of micro-cracks in the chemical thermal storage medium. Or in other words, sintering the sepiolite, and generation of micro-cracks in the chemical thermal storage medium, do not have an adverse affect on each other. The chemical thermal storage medium is dispersed and held in the sepiolite, and so is suppressed from being pulverized due to the micro-cracks.

A manufacturing method of a heat exchanger heat-utilization device according to a second aspect of the present invention comprises: a molding process that employs particles of a chemical thermal storage medium to form a chemical thermal storage medium molded body that has a flow channel supplying a reactant or for discharging a reaction product, and has an external shape insertable into a thermal storage medium containing portion of a heat exchanger structural body; an insertion process that inserts the chemical thermal storage medium molded body formed by the molding process into the thermal storage medium containing portion of the heat exchanger structural body; and a firing process that fires the chemical thermal storage medium molded body while still inserted by the insertion process into the thermal storage medium containing portion of the heat exchanger structural body.

According to the above aspect, in the molding process, particles of a chemical thermal storage medium are formed into shape that can be inserted into a thermal storage medium containing portion of a heat exchange structural body, and the chemical thermal storage medium molded body is formed with a flow channel, then progression is made to the insertion process. In the insertion process, the chemical thermal storage medium molded body is inserted into the thermal storage medium containing portion of the heat exchanger structural body, and then progression is made to the firing process. In the firing process, the chemical thermal storage medium molded body is fired by heating the heat exchanger structural body inserted with the chemical thermal storage medium molded body, inserted into the thermal storage medium containing portion at the insertion process. Due thereto, within the thermal storage medium containing portion of the heat exchange structural body, the chemical thermal storage medium molded body is formed as a porous structural body of specific shape (spatial shape) overall, with pores formed between particles (of chemical thermal storage medium) and having a flow channel. Note that, for example, the molding process and the insertion process may be performed at the same time.

In a heat exchanger heat-utilization device manufactured in this manner, there are gaps (diffusions paths), allowing the diffusion of a reactant and the like, formed between the particles (of chemical thermal storage medium) in the chemical thermal storage medium molded body, and there is also a flow channel formed for introducing a reactant supplied into the chemical thermal storage medium molded body during heat storage and heat dissipation, or for discharging a reaction product generated by heat storage or heat dissipation. Therefore, as well as the diffusion paths for a reactant and the like, a movement flow channel for the above reactant and reaction product is separately structurally secured. Due thereto, in the chemical thermal storage medium molded body of the present heat exchanger heat-utilization device, reactant is introduced through the flow channel and diffuses through the pores of the porous structural body, and discharge is achieved of the reaction product that is given off and passes through the flow channel, with good reactivity for heat storage and heat dissipation. However, since this flow channel is formed internally within the chemical thermal storage medium molded body, the flow channel does not impede the heat transfer ability of the chemical thermal storage medium molded body.

In the present heat exchanger heat-utilization device, since heat is stored in the chemical thermal storage medium molded body by heat exchange with the heat exchange medium, or heat of the chemical thermal storage medium molded body is extracted, heat exchange for heat storage and/or heat dissipation, in at least one of the heat storage reaction and/or the heat dissipation reaction, can be performed by heat exchange with the heat exchange medium that is external to the thermal storage medium containing portion. Therefore, there is no impediment to the movement of the reactant or the reaction product during reaction, due to mixing with the heat exchange medium flowing in the thermal storage medium containing portion, or the like, and movement speed of the reactant or reaction product is secured, and the reactivity for heat storage or heat dissipation is even better. Furthermore, by maintaining a high water vapor pressure for supply/discharge during hydration and dehydration reactions, a high reaction rate can be secured. Furthermore, since the chemical thermal storage medium molded body is adhered to the partitioning body of the heat exchange structural body, there is good heat exchange capability between the chemical thermal storage medium molded body and the heat exchange medium flowing in the heat exchange medium flow channel.

Furthermore, in the manufacturing method of the present heat exchanger heat-utilization device, due to the chemical thermal storage medium molded body being fired in an inserted state in the thermal storage medium containing portion of the heat exchange structural body, the outer faces of the chemical thermal storage medium molded body are adhered to the partitioning body of the heat exchange structural body. Due thereto, the heat transfer efficiency is even better, from the chemical thermal storage medium molded body, through the partitioning body, to the heat exchange medium.

In the manufacturing method of the heat exchanger heat-utilization device as described in the above aspect, a chemical thermal storage medium molded body can be obtained capable of efficient heat storage and heat dissipation to and from the chemical thermal storage medium.

In the above aspect, a method may be employed in which the molding process uses a mixed and kneaded product, from mixing and kneading clay mineral with the chemical thermal storage medium at a specific proportion, to form the chemical thermal storage medium molded body.

According to the above aspect, by mixing and kneading the clay mineral with the chemical thermal storage medium, the chemical thermal storage medium can be dispersed and held in a porous clay mineral skeleton. Thereby, the strength of the above porous structural body can be made high, and, as a porous structural body, a structurally stable chemical thermal storage medium molded body, namely heat exchanger heat-utilization device, can be obtained.

In the above aspect, the method may employ a clay mineral having a layered ribbon structure as the clay mineral.

According to the above aspect, due to the clay mineral being porous and forming a fibrous state with a large relative surface area, the particles of chemical thermal storage medium can be organized and structured by utilizing the fibrous nature and plasticity thereof.

In the above aspect, the method may employ sepiolite or palygorskite as the clay mineral having a layered ribbon structure.

According to the above aspect, since sepiolite or palygorskite (attapulgite) having a layered ribbon structure is employed for at least a portion of the clay mineral, by utilizing the fibrous nature and plasticity thereof, the particles of chemical thermal storage medium can be successfully organized and structured.

In the above aspect, the method may employ bentonite as the clay mineral.

According to the above aspect, due to bentonite being employed, which is a clay mineral with strong binding force, by utilizing the binding force, the particles of chemical thermal storage medium can be successfully organized and structured.

In the above aspect, in the molding process, the method may employ the clay mineral formed as a fine fibrous state, finer than the particle size of the chemical thermal storage medium.

According to the above aspect, due to the clay mineral being formed as a fibrous state, having fine fiber diameters, it is possible to organize and structured the particles of chemical thermal storage medium using a small amount of clay mineral for mixing and kneading in the molding process. Due thereto, a chemical thermal storage medium molded body can be obtained with a large occupancy ratio of the chemical thermal storage medium per unit weight and per unit volume.

In the above aspect, the method may employ a hydration reaction chemical thermal storage medium as the chemical thermal storage medium, absorbing heat during a dehydration reaction and dissipating heat during a hydration reaction, and in the molding process, the chemical thermal storage medium may be mixed and kneaded in its hydrated state with the clay mineral.

According to the above aspect, in the molding process, due to the mixing and kneading of the chemical thermal storage medium in its hydrated state with the clay mineral, there is no concern of a reaction with water occurring, as when the dehydrated state of the chemical thermal storage medium is used. Therefore, water can be employed in the molding process as a binder when mixing and kneading.

In the above aspect, the method may employ a hydration reaction chemical thermal storage medium as the chemical thermal storage medium, oxidizing during a dehydration reaction and hydroxylating during a hydration reaction, and in the molding process, the chemical thermal storage medium may be mixed and kneaded in its hydroxide state with the clay mineral.

According to the above aspect, in the molding process, due to the mixing and kneading of the chemical thermal storage medium in its hydrated state with the clay mineral, there is no concern of a reaction with water occurring, as when the dehydrated state of the chemical thermal storage medium is used. Therefore, water can be employed in the molding process as a binder when mixing and kneading.

In the above aspect, the method may employ an inorganic compound as the hydration reaction chemical thermal storage medium.

According to the above aspect, due to an inorganic compound being employed as the chemical thermal storage medium, the material stability of the produced chemical thermal storage medium molded body to heat storage and heat dissipation reactions (hydration and dehydration) is high. Therefore, a stable heat storage effect can be obtained over a long duration.

In the above aspect, the method may employ an alkali earth metal compound as the inorganic compound.

According to the above aspect, due to employing an alkali earth metal compound (hydroxide), safety during production can be readily secured. Furthermore, safety is readily secured, including during use and recycling of the product (the chemical thermal storage medium molded body). Furthermore, in the configuration in which sepiolite is employed as the clay mineral, since glassification is promoted due to reaction of the hydroxide alkaline earth metal compound and the clay mineral (in particular, the above-described clay mineral), this contributes to an increase in the strength of the porous structural body.

In the above aspect, in the firing process, the method may perform firing at a temperature that makes the hydration reaction chemical thermal storage medium be in the dehydrated state.

According to the above aspect, due to the hydration chemical thermal storage medium being in the dehydrated state after firing in the firing process, the relative surface area of the chemical thermal storage medium is readily adjusted.

In the above aspect, in the firing process, the method may perform firing at a temperature at which fine cracks are formed in the chemical thermal storage medium.

According to the above aspect, as a result of the firing in the firing process, the clay mineral is structured together with the chemical thermal storage medium (a sintered state is secured) and, in conjunction with this, fine cracks are formed in the chemical thermal storage medium of dehydrated state. Thereby, the relative surface area of the chemical thermal storage medium, in the chemical thermal storage medium molded body formed as the porous structural body, can be increased, contributing to raising the heat storage and heat dissipation reaction rates. Note that the firing temperature of the clay mineral is preferably close to the dehydration temperature of the hydration reaction chemical thermal storage medium, and as an example of such a combination, for example, a combination of an alkali earth metal compound (dehydration temperature of 400° C. to 450° C.) and sepiolite (firing temperature of 350° C.) can be given.

Effect of the Invention

The heat exchanger heat-utilization device according to the present invention as explained above, and a heat exchanger heat-utilization device manufactured by the manufacturing method of a heat exchanger heat-utilization device according to the present invention, exhibit the excellent effect of being able to perform efficient heat exchange (heat storage or heat dissipation) with the chemical thermal storage medium.

BEST MODE OF IMPLEMENTING THE INVENTION

Figure 1:
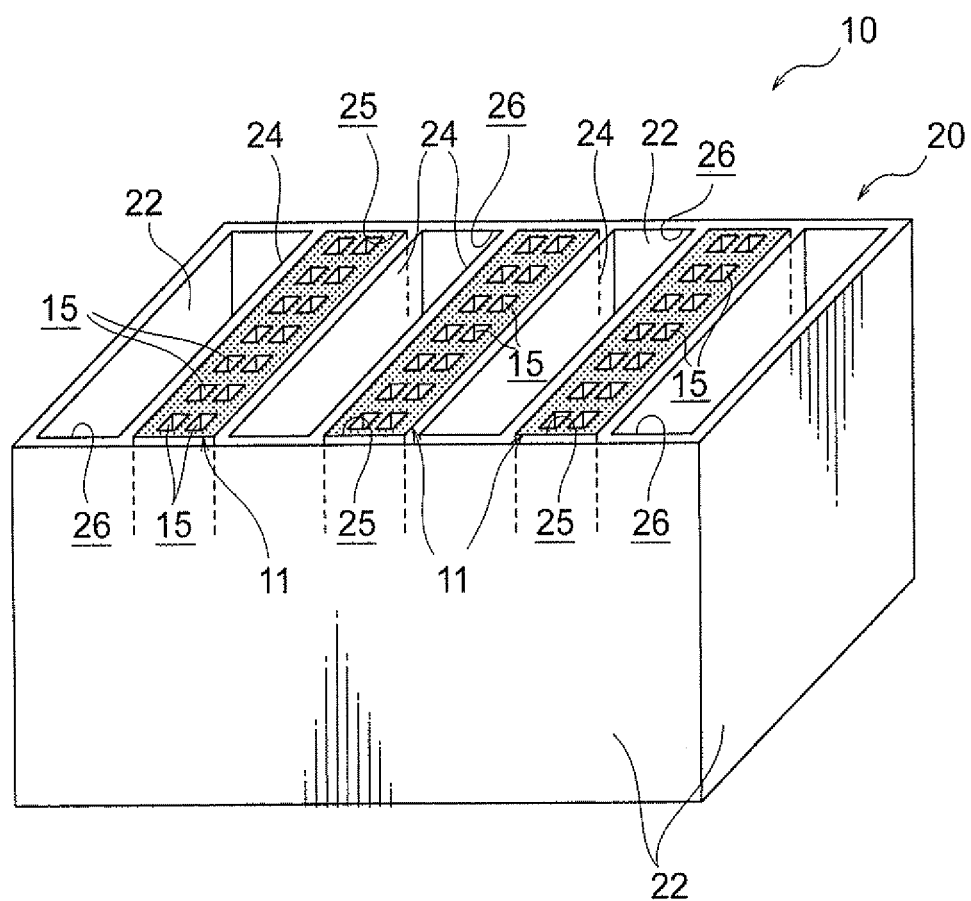
FIG. 1 is a perspective view showing a schematic configuration of a heat exchanger heat-utilization device according to an exemplary embodiment of the present invention.
Figure 2:
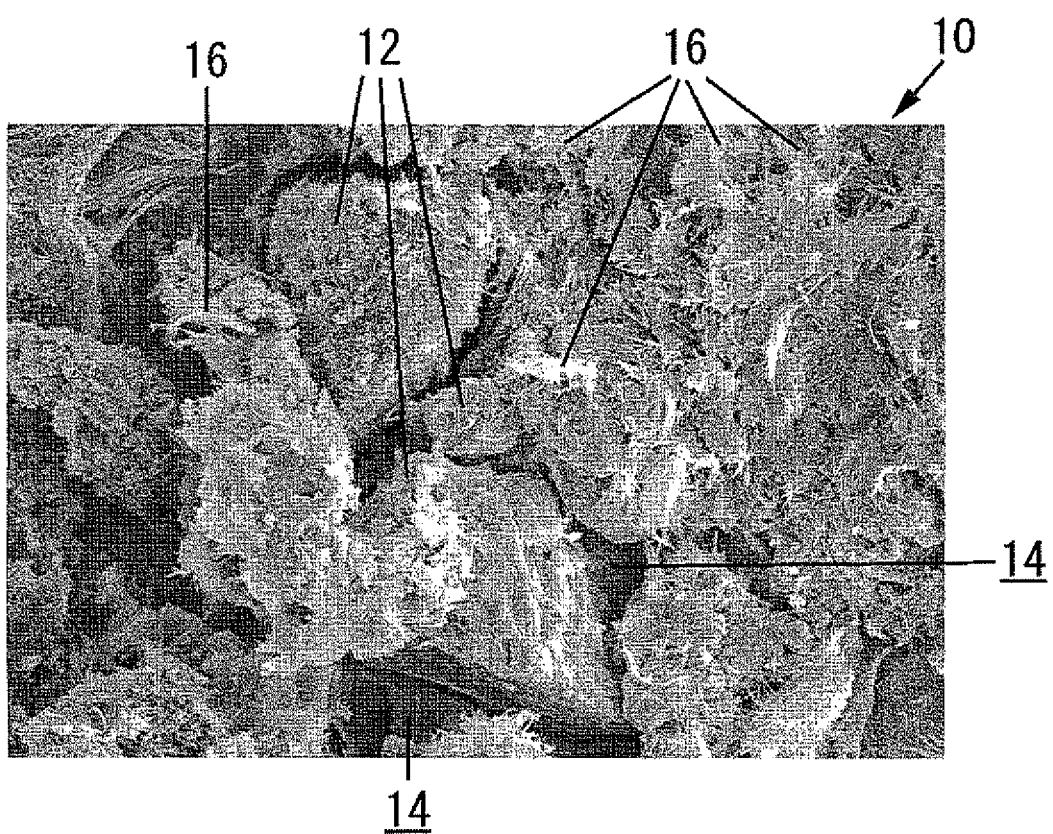
FIG. 2 is a cross-section schematically showing the internal structure of a chemical thermal storage medium molded body according to an exemplary embodiment of the present invention.
Figure 3:
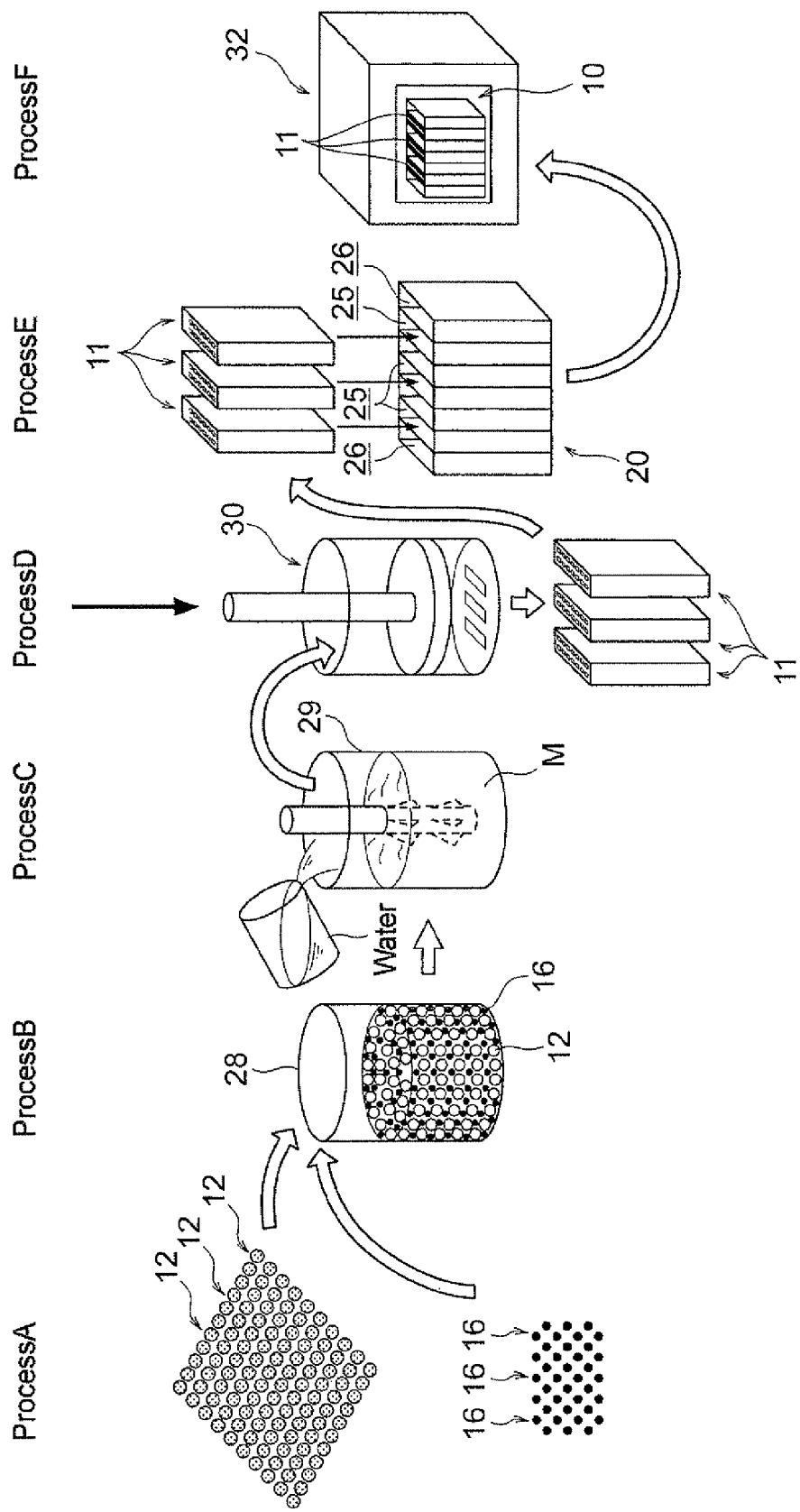
FIG. 3 is a drawing showing schematic representations of processes A to F in a manufacturing method of a chemical thermal storage medium molded body according to the present invention.

Explanation follows regarding a heat exchanger heat-utilization device 10, serving as a heat exchanger heat-utilization device according to an exemplary embodiment of the present invention, and regarding a manufacturing method of the same, with reference to FIG. 1 to FIG. 3.

A schematic perspective view of a schematic configuration of the heat exchanger heat-utilization device 10 is shown in FIG. 1. As shown in this figure, the heat exchanger heat-utilization device 10 is equipped with a heat exchanger body 20, serving as a heat exchanger structural body, and chemical thermal storage medium composite molded bodies 11, serving as chemical thermal storage medium molded body, provided to the heat exchanger body 20. The heat exchanger body 20 has a shell (outer wall) 22, and partition walls 24, serving as partitioning bodies, that partition the space inside of the shell 22 into plural sections. Due thereto, thermal storage medium containing portions 25 that contain the chemical thermal storage medium composite molded bodies 11, and fluid flow channels 26, serving as heat exchange medium flow channels through which a fluid flows, serving as a heat exchange medium for performing heat exchange with the chemical thermal storage medium composite molded bodies 11, are alternately disposed inside the heat exchanger body 20.

In the present exemplary embodiment, the thermal storage medium containing portions 25 and the fluid flow channels 26 are each rectangular pillar shaped spaces with open ends of planar rectangular shape having a long edge of the partition walls 24. In the present exemplary embodiment, the heat exchanger body 20 is configured with the thermal storage medium containing portions 25 and the fluid flow channels 26 disposed adjacent to each other in a planar cross-section direction, and with fluid flow channels 26 disposed at both ends in the adjacency direction. In the present exemplary embodiment, the heat exchanger body 20 is configured from a metal material, such as, for example, stainless steel or aluminum (including aluminum alloys), or the like.

As shown in FIG. 1, the chemical thermal storage medium composite molded body 11 is formed in a planar rectangular pillar shape corresponding to the thermal storage medium containing section 25 (or more precisely, a honey comb shape, like that described below), and the chemical thermal storage medium composite molded body 11 is accommodated in the thermal storage medium containing section 25 such that the outer peripheral faces of the chemical thermal storage medium composite molded body 11 are adhered to (touching) the inner peripheral faces of the thermal storage medium containing section 25. Namely, the two plane direction end faces of the chemical thermal storage medium composite molded body 11 each adhere to the partition walls 24.

FIG. 2 shows a schematic cross-section of the chemical thermal storage medium composite molded body 11. As shown in this figure, the chemical thermal storage medium composite molded body 11 is formed as a body in which plural chemical thermal storage medium particles 12, serving as chemical thermal storage medium, are organized and structured with pores 14 formed between the plural chemical thermal storage medium particles 12. Consequently, the chemical thermal storage medium composite molded body 11 according to the present exemplary embodiment can be thought of as being a porous structural body (porous body), and can be thought of as being configured with the chemical thermal storage medium particles 12 exposed at the internal faces of the pores 14.

In the chemical thermal storage medium composite molded body 11, there is sepiolite 16, which is a clay mineral, present between the plural chemical thermal storage medium particles 12, so as to intertwine with the plural chemical thermal storage medium particles 12. In other words, the chemical thermal storage medium composite molded body 11 can be thought of as being a structure in which the plural chemical thermal storage medium particles 12 are dispersed and held in skeleton of the sepiolite 16 formed into porous matter. Thereby, in the chemical thermal storage medium composite molded body 11, the structure with the pores 14 formed between the plural chemical thermal storage medium particles 12, serving as a porous structural body, is held (reinforced) by the sepiolite 16.

In the present exemplary embodiment, the plural chemical thermal storage medium particles 12 are calcium hydroxide $(Ca(OH)_2)$, configured to store heat (absorb heat) during dehydration, and dissipate heat (generate heat) during hydration (returning to calcium hydroxide). Namely, the plural chemical thermal storage medium particles 12 are configured such that heat storage and heat dissipation is reversibly obtained by repetitions of the reactions shown below.

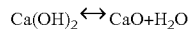

$Ca(OH)_2 \leftrightarrow CaO + H_2O$

When the heat storage amount and heat generation amount Q is shown combined with this equation then this becomes:

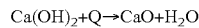

$Ca(OH)_2 + Q \rightarrow CaO + H_2O$

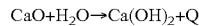

$CaO + H_2O \rightarrow Ca(OH)_2 + Q$

The sepiolite 16 can be thought of as being a clay mineral having a layered ribbon structure, or more specifically as a clay mineral in which single chains that resemble a pyroxene, multi-bonded into tetrahedra ribbons. The sepiolite 16 is a hydrated magnesium silicate that can, for example, be represented as the chemical formula $Mg_8Si_{12}O_{30}(OH)_4 \cdot 8H_2O$, and sepiolite forms a fibrous body that is both porous itself and has a large relative surface area. Note that in the present exemplary embodiment, variant species to that shown in the chemical formula above are also included within the sepiolite 16.

The heat exchanger heat-utilization device 10, as shown in FIG. 1, has flow channels (paths) 15, for discharging water vapor as a reaction product when storing heat, and for supplying water vapor as a reactant when dissipating heat. The flow channels 15 are formed so as to pass through within the heat exchanger heat-utilization device 10 in a specific direction, and have typical dimensions that are sufficiently large with respect to the pores 14. In the present exemplary embodiment, the flow channels 15 are formed with substantially rectangular shaped openings having, for example, a typical size (for example, the length of the shortest side), which is a typical dimension of the flow channels 15, that is sufficiently larger than the average size of the pores 14 and the average particle size of the chemical thermal storage medium particles 12. Note that in the present exemplary embodiment, for example, the typical dimension of the flow channels 15 is about 1 mm, and the average particle size of the chemical thermal storage medium particles 12 and the average size of the pores 14 are several tens of μm, respectively.

Furthermore, the chemical thermal storage medium composite molded body 11 has plural of the flow channels 15. In the present exemplary embodiment, the chemical thermal storage medium composite molded body 11 is formed with plural of the flow channels 15 into a honey comb shape (lattice shape), as shown in FIG. 1. In the chemical thermal storage medium composite molded body 11, the thickness of the partition wall sections sectioning between adjacent flow channels 15 is 8 mm or less. In the present exemplary embodiment, the thickness of the partition wall sections is 4 mm or less, or about 3 mm. Furthermore, in the heat exchanger heat-utilization device 10, the thickness of an outer wall sections positioned between the flow channels 15 and the outer peripheral faces (the face that is adhered to the partition wall 24) is 4 mm or less. In the present exemplary embodiment, the thickness of the outer wall sections is 2 mm or less, or about 1.5 mm.

In the chemical thermal storage medium composite molded body 11 as explained above, when heat is supplied to the chemical thermal storage medium particles 12 in the calcium hydroxide state, using this heat as reaction heat, the chemical thermal storage medium particles 12 becomes oxidized. Namely, the heat exchanger heat-utilization device 10 is configured such that the chemical thermal storage medium particles 12 undertake a dehydration reaction to become calcium oxide, while discharging water vapor through the pores 14 or directly from the flow channels 15, storing heat equivalent to the above reaction heat. However, in the heat exchanger heat-utilization device 10, when water vapor is supplied to the chemical thermal storage medium particles 12, either directly from the flow channels 15 or through the pores 14 (by diffusion), the chemical thermal storage medium particles 12 dissipate heat while being hydroxylated by a hydration reaction.

The heat exchanger heat-utilization device 10 is configured such that, when storing heat, heat supply to the chemical thermal storage medium composite molded bodies 11 within the thermal storage medium containing sections 25 is performed by heat exchange through the partition walls 24 with a fluid (gas) flowing through the fluid flow channels 26. In the heat exchanger heat-utilization device 10, the heat that is dissipated by the chemical thermal storage medium composite molded body 11 is received by the fluid (gas) flowing through the fluid flow channels 26, by heat exchange through the partition walls 24.

The heat exchanger heat-utilization device 10 is configured such that the thermal storage medium containing portions 25 (the flow channels in communication therewith) for communicating with the flow channels 15 of the chemical thermal storage medium composite molded bodies 11, are employed to discharge water vapor as the reaction product generated during the heat storage reaction of the chemical thermal storage medium composite molded body 11, and are employed to supply water vapor as a reactant to induce the heat dissipation reaction in the chemical thermal storage medium composite molded bodies 11.

Explanation follows of a manufacturing method of the heat exchanger heat-utilization device 10.

FIG. 3 schematically shows a manufacturing method of the heat exchanger heat-utilization device 10. In manufacturing the heat exchanger heat-utilization device 10, first, the chemical thermal storage medium composite molded bodies 11 are formed (produced) by the molded body molding processes shown as process A to process D in FIG. 3. Specifically, first, as shown in process A, the raw materials of the chemical thermal storage medium particles 12 and the sepiolite 16 are prepared.

As the chemical thermal storage medium particles 12, for example, particles may be employed with an average particle size D=10 μm (as measured by laser diffraction method, with a Shimadzu SALD-2000A), and as the sepiolite 16, material formed in a fibrous state may be employed, having fiber diameters when suspended in water that are smaller than the average particle size D of the chemical thermal storage medium particles 12. Specifically, preferably employed is sepiolite 16 having a strand diameter (fiber diameter) of 1 μm or less, and a length thereof (fiber length) of 200 μm or less. In the present exemplary embodiment, Turkish sepiolite having a strand diameter of about 0.01 μm and a length of several tens of μm is employed. Note that, for example, Spanish sepiolite having a strand diameter of about 0.1 μm and a length of about 100 μm can be employed in place of Turkish sepiolite. Furthermore, in the present exemplary embodiment, the mixing ratio of the sepiolite 16 relative to the chemical thermal storage medium particles 12 is, for example, about 5 to 10% by weight.

Next, progression is made to the mixing process. In the mixing process shown as process B in FIG. 3, the chemical thermal storage medium particles 12 and the sepiolite 16, each in respective dry states thereof, are uniformly mixed in a mixing container 28. Next, progression is made to the mixing-kneading process. In the mixing-kneading process shown as process C in FIG. 3, the resultant mix of chemical thermal storage medium particles 12 and sepiolite 16 is put into a kneading machine 29, and, while gradually adding water as a binder, kneading (mixing and kneading) is carried out, thereby thickening. A mixed and kneaded product M of the chemical thermal storage medium particles 12 and the sepiolite 16 is generated thereby. This mixed and kneaded product M exhibits a clay like state, as a whole. Furthermore, in the present exemplary embodiment, an organic binder (for example carboxyl methyl cellulose (CMC) or the like), is mixed in as a lubricant and binder, and kneading and mixing performed. This organic binder is given off in a firing process at 400° C. or higher, described below, and is not residual in the formed product. This organic binder exhibits the action of a glue, and has the effect of raising the precision and density when forming the structural bodies.

Next, progression is made to the molding process, shown as process D in FIG. 3. In the molding process, the mixed and kneaded product M of the chemical thermal storage medium particles 12 and the sepiolite 16, which has been thickened by the mixing-kneading process as described above, is moved into an extrusion mold 30, and extrusion molded. The above mixed and kneaded product M is thereby formed into a specific shape according to the extrusion mold 30, namely, it is formed into the planner honey comb shapes corresponding to the storage material containing sections 25 of the heat exchanger body 20. The chemical thermal storage medium composite molded bodies 11 are thereby formed.

Next, progression is made to the insertion process, shown as process E in FIG. 3. In the insertion process, the chemical thermal storage medium composite molded bodies 11 are pressure-inserted into the storage material containing sections 25 of the heat exchanger body 20. When this is carried out, the chemical thermal storage medium composite molded bodies 11 that are soft prior to firing are inserted into the fluid flow channels 26, while conforming to the internal faces of the storage material containing sections 25 of the heat exchanger body 20.

Next, progression is made to the firing process, shown as process F of FIG. 3. In the firing process, the heat exchanger body 20 into which the chemical thermal storage medium composite molded bodies 11 have been inserted is placed in a kiln 32, and the chemical thermal storage medium composite molded bodies 11 are fired at a specific temperature for a specific duration. Due thereto, the chemical thermal storage medium composite molded bodies 11 are hardened within the storage material containing sections 25 of the heat exchanger body 20, and production of the heat exchanger heat-utilization device 10 is completed. This firing process is performed with a firing temperature in the range of from 350° C. to 500° C.

Since this firing temperature is the dehydration temperature of the chemical thermal storage medium particles 12, namely of the calcium hydroxide (the dehydration temperature varies depending on the atmospheric water vapor pressure, however is about 400° C. to about 450° C.) or higher, the chemical thermal storage medium particles 12, configure the chemical thermal storage medium composite molded bodies 11 in the calcium oxide state just after manufacture. Namely, the chemical thermal storage medium composite molded bodies 11, at the point of manufacture, are in a heat stored state, capable of dissipating heat by supply of moisture (water vapor).

Furthermore, a firing temperature in the range of 400° C. to 500° C. in the firing process is a temperature that forms micro-cracks in the chemical thermal storage medium particles 12, and due thereto, the plural chemical thermal storage medium particles 12 configuring the chemical thermal storage medium composite molded bodies 11, as respectively shown in FIG. 1, have micro-cracks. The relative surface area of the chemical thermal storage medium particles 12 is thereby increased through the firing process.

In the heat exchanger heat-utilization device 10 here, since the flow channels 15 are formed within the chemical thermal storage medium composite molded body 11, both the discharge paths for water vapor generated by each of the chemical thermal storage medium particles 12 of the chemical thermal storage medium composite molded body 11 during heat storage, and also the supply paths for water vapor required for supply to each of the chemical thermal storage medium particles 12 of the chemical thermal storage medium composite molded bodies 11 during heat dissipation, are secured. Namely, in the heat exchanger heat-utilization device 10, since the flow channels 15, larger than the pores 14, are formed in the chemical thermal storage medium composite molded body 11, which is a porous structural body in which the pores 14 are formed between the plural chemical thermal storage medium particles 12, as well as forming a porous structural body with a high overall fill rate of the chemical thermal storage medium particles 12, it is also possible to discharge and supply water vapor fast through the flow channels 15.

Therefore, in the heat exchanger heat-utilization device 10, due to the high fill rate (high density) of the chemical thermal storage medium particles 12, heat storage capacity per unit volume and unit weight can be secured (raised), together with also securing the migration speed for discharge water vapor and supply water vapor required for heat dissipation and heat storage. In the heat exchanger heat-utilization device 10, since the storage material containing sections 25 for configuring the flow channels of the water vapor discharged from the chemical thermal storage medium composite molded bodies 11 or supplied to the chemical thermal storage medium composite molded bodies 11, are partitioned by the fluid flow channels 26, through which a fluid flows that dissipates heat to the chemical thermal storage medium composite molded bodies 11 or receives heat from the chemical thermal storage medium composite molded bodies 11, there is no affect to the above migration speed of the discharge water vapor and the supply water vapor, from the fluid that performs heat exchange with the chemical thermal storage medium composite molded body 11. Furthermore, by maintaining a high water vapor pressure for supply/discharge during hydration and dehydration reactions, a high reaction rate can be secured.

Due thereto, in the heat exchanger heat-utilization device 10, due to the receipt of heat from the fluid flowing in the fluid flow channels 26, heat storage can be efficiently performed while water vapor is being discharged from the storage material containing sections 25. Furthermore, heat can be transmitted to the fluid flowing in the fluid flow channels 26 by efficient heat dissipation due to the receipt of water vapor supplied into the storage material containing sections 25.

Furthermore, in the heat exchanger heat-utilization device 10, since the outer peripheral faces of the chemical thermal storage medium composite molded bodies 11 are adhered to the partition walls 24 forming the heat transmission walls partitioning the storage material containing sections 25 from the fluid flow channels 26, there is good heat exchange capability between the fluid flowing in the fluid flow channels 26 and the chemical thermal storage medium composite molded body 11. Namely, in the heat exchanger heat-utilization device 10, a high heat transfer (heat transmission) can be realized between the fluid flowing in the fluid flow channels 26 and the chemical thermal storage medium composite molded body 11.

For example, in a chemical heat storage reaction section simply filled with a chemical thermal storage medium particles, while the fill rate of the chemical thermal storage medium particles can be raised, sufficient discharge and supply of water vapor is not achieved, and the amount of heat stored is smaller than the heat storage capacity based on the fill rate of the chemical thermal storage medium particles. Furthermore, in such a configuration, it is difficult to achieve both heat storage and heat dissipation reactivity and heat exchange capability, due to the flow channels through which water vapor and heat exchange medium fluid body flow being common to each other. Namely, for example, if the partial pressure of the supplied water vapor falls due to flow of a heat exchange medium fluid when dissipating heat, then the reactivity falls, and when a circulating fluid is employed as the heat exchange medium fluid, there is a concern that a portion of the circulating fluid would be discharged outside the system, together with water vapor generated during heat storage, reducing the heat storage capability.

In contrast thereto, in the heat exchanger heat-utilization device 10, the flow channels 15 are provided to the chemical thermal storage medium composite molded bodies 11 as described above, and by the storage material containing sections 25 being partitioned by the fluid flow channels 26, the heat storage and heat dissipation reactivity is secured, and by the storage material containing sections 25 being partitioned by the fluid flow channels 26 and the chemical thermal storage medium composite molded bodies 11 being adhered to the partition walls 24, the heat exchange capability between the fluid flowing in the fluid flow channels 26 and the chemical thermal storage medium composite molded bodies 11 is secured. Namely, in the heat exchanger heat-utilization device 10, both resolution of inadequate water vapor migration amount (diffusion limitation), and resolution of inadequate heat transfer from the chemical thermal storage medium composite molded bodies 11 to the heat exchange medium fluid (heat transfer limitation), are achieved, hence a raising of the heat storage capability and a raising of the recovery (yield) of the heat that has been stored, are both achieved.

However, in the heat exchanger heat-utilization device 10, the storage material containing sections 25 of the heat exchanger body 20 are inserted into the chemical thermal storage medium composite molded bodies 11 prior to firing, and the chemical thermal storage medium composite molded bodies 11 are configured with the chemical thermal storage medium composite molded bodies 11 fired in a state conforming to the partition walls 24, therefore the adherence at the interface between the chemical thermal storage medium composite molded bodies 11 and the partition walls 24 is high. However, in the heat exchanger heat-utilization device 10, since the sepiolite 16 can be expected to be sucked in towards the partition walls 24 by capillary force during sintering of the chemical thermal storage medium composite molded body 11, the adherence at the interface of the chemical thermal storage medium composite molded bodies 11 and the partition walls 24 is raised even higher. Due thereto, the heat exchange capability (heat transfer ability) between the chemical thermal storage medium composite molded bodies 11 and the fluid flowing in the fluid flow channels 26 is raised still further.

Furthermore, in the heat exchanger heat-utilization device 10, there are plural of the flow channels 15 formed in the chemical thermal storage medium composite molded bodies 11, and since the thickness of the partition wall sections between the flow channels 15 in the chemical thermal storage medium composite molded bodies 11 is 8 mm or less (with a distance from the closest flow channels 15 of 4 mm or less), and the thickness of the outer wall sections between the flow channels 15 and the outer peripheral faces is 4 mm or less, the diffusion path for supply of water vapor to the chemical thermal storage medium particles 12 from the flow channels 15, and for discharge of water vapor from the chemical thermal storage medium particles 12 to the flow channels 15, is short.

Hence, in the chemical thermal storage medium composite molded bodies 11 of comparatively large size (thickness) configuring the heat exchanger heat-utilization device 10, the water vapor migration amount, required for the necessary heat storage and heat dissipation reactions for each section (of chemical thermal storage medium particles 12), is secured. In particular, in the present exemplary embodiment, since the thickness of the partition wall sections between the flow channels 15 is 4 mm or less, and the thickness of the outer wall sections between the flow channels 15 and the outer peripheral faces is 2 mm or less, an even better water vapor migration amount to that described above is secured. Furthermore, since there are plural flow channels 15 in the chemical thermal storage medium composite molded bodies 11, since the partition wall sections between the flow channels 15 also function as heat transfer paths within the chemical thermal storage medium composite molded bodies 11, efficient transfer of internally heat dissipated to the partition walls 24 occurs in the comparatively thick configuration as described above.

Furthermore, in the manufacturing method of the heat exchanger heat-utilization device 10 here, in the molded body molding process for forming the chemical thermal storage medium composite molded bodies 11, since the sepiolite 16, which is porous matter having a high relative surface area, is mixed and kneaded in with the chemical thermal storage medium particles 12 at a specific proportion in the mixing-kneading process, a thickening effect is exhibited when the sepiolite 16 is kneaded in with the chemical thermal storage medium particles 12 and water, due to the thixotropy of the sepiolite 16. Due thereto, the chemical thermal storage medium composite molded bodies 11, formed with the chemical thermal storage medium particles 12 as a base, can be formed with a higher precision and higher density.

The chemical thermal storage medium particles 12 are organized by utilizing the fibrous nature of the sepiolite 16 (the porous nature after crystallization), and structuring of the chemical thermal storage medium particles 12 is accomplished utilizing the plasticity of the sepiolite 16. Namely, by kneading and mixing the sepiolite 16 into the chemical thermal storage medium particles 12 at a specific proportion, the pores 14 are formed between the plural chemical thermal storage medium particles 12 for discharging and introducing water vapor during heat storage and heat dissipation, and the plural chemical thermal storage medium particles 12 are realized into a single structural body, of the chemical thermal storage medium composite molded body 11, and maintained as the chemical thermal storage medium composite molded body 11.

Furthermore, since the chemical thermal storage medium composite molded bodies 11 manufactured as described above are made into bodies and structured such that the pores 14 are formed between the plural chemical thermal storage medium particles 12, volumetric expansion and contraction during hydration and dehydration of the chemical thermal storage medium particles 12 can be prevented, or significantly suppressed, from interfering with others of the chemical thermal storage medium particles 12. Therefore, pulverization caused by the volumetric expansion and contraction of the chemical thermal storage medium particles 12 is prevented, or in other words, delay to discharge and introduction of water vapor to the chemical thermal storage medium particles 12 does not occur, and a fall off in the heat storage and heat dissipation reactivity can be prevented, or significantly suppressed.

Furthermore, in the chemical thermal storage medium composite molded bodies 11, due to the absorption capability of the sepiolite 16, which is porous matter with a large relative surface area, excess water vapor is sucked in to the sepiolite 16 (into the micro-pores therein). Due thereto, for example, if a heat storage system applied with the chemical thermal storage medium composite molded bodies 11 is turned off and is in a low temperature state (when the chemical thermal storage medium particles 12 are calcium oxide or magnesium oxide), the chemical heat storage material particles 12 can be prevented or significantly suppressed from absorbing water, and water can be prevented or significantly suppressed from liquefying in the chemical heat storage material composite molded bodies 11.

Furthermore, in the manufacturing method of the heat exchanger heat-utilization device 10 here, in the molded body molding process for forming the chemical thermal storage medium composite molded bodies 11, since the sepiolite 16 is employed that is formed in a fine fibrous state, with fiber diameters when suspended in water that are finer than the average particle size D of the chemical thermal storage medium particles 12, the chemical thermal storage medium composite molded bodies 11 can be obtained as porous structural bodies formed with the pores 14 between the chemical thermal storage medium particles 12 and reinforced with a small amount of the sepiolite 16. Consequently, in the chemical thermal storage medium composite molded bodies 11, the amount of chemical thermal storage medium particles 12 per unit weight, and per unit volume, can be increased. Namely, the chemical thermal storage medium composite molded bodies 11 can be obtained with large heat storage capacity. However, in the chemical thermal storage medium composite molded bodies 11, since the chemical thermal storage medium particles 12 themselves form the main structure of the chemical thermal storage medium composite molded bodies 11, the heat transfer path is simple, and heat storage efficiency and utilization of the stored heat is high.

Furthermore, in the chemical thermal storage medium composite molded bodies 11, since the inorganic compound of calcium hydroxide is employed for the chemical thermal storage medium particles 12, the material stability to heat storage and heat dissipation reactions (hydration and dehydration) is high. In particular, since calcium hydroxide has a high reversibility (nearly 100% hydration and dehydration reaction rates), such as relative to magnesium hydroxide or the like, a stable heat storage effect can be obtained over a long duration. Furthermore, since calcium hydroxide has a low sensitivity to impurities, such as relative to magnesium hydroxide or the like, this point also contributes to long term stable operation. Furthermore, in particular, since calcium hydroxide, which is an alkali earth metal compound, is employed as the chemical thermal storage medium particles 12, or in other words, since a material with a low environmental impact is employed, safety, including manufacture, use, and recycling of the chemical thermal storage medium composite molded bodies 11, is readily secured.

Furthermore, in the manufacturing method of the heat exchanger heat-utilization device 10 here, since particles of calcium hydroxide, a hydroxide compound, are used to manufacture the chemical thermal storage medium composite molded bodies 11, water can be employed as the binder in the mixing-kneading process for kneading and thickening the chemical thermal storage medium particles 12 and the sepiolite 16. The chemical thermal storage medium composite molded bodies 11 can thereby be obtained by a simple and cheap method. For example, if calcium oxide were to be employed as the starting material, since calcium oxide reacts with water, water (and aqueous liquids) could not be used as the binder. Furthermore, for example, if calcium carbonate were to be used as the starting material for obtaining the chemical thermal storage medium particles 12 (calcium hydroxide), then high temperature firing at about 950° C. to 1000° C. would be required during decarboxylation.

In contrast, in the manufacturing method of the heat exchanger heat-utilization device 10, since the manufacturing method of the heat exchanger heat-utilization device 10 employs calcium hydroxide as the starting material, as described above, a thickening effect is obtained by mixing and kneading water as a binder and sepiolite 16, raising the moldability. Furthermore, since the firing temperature can be lowered, degrees of freedom for materials and processes used (including, for example, materials used for the manufacturing equipment and the like) are increased. Furthermore, in the chemical thermal storage medium composite molded bodies 11, since alkaline calcium hydroxide is mixed and kneaded with the sepiolite 16, the sepiolite slightly reacts with the alkali and is slightly converted into a glass-like substance. Due thereto, the strength of the chemical thermal storage medium composite molded bodies 11, which is a sintered structural body formed by sintering the mixed and kneaded product M of the glassified sepiolite 16 and the chemical thermal storage medium particles 12, is raised.

However, in the manufacturing method of the heat exchanger heat-utilization device 10, since 400° C. to 500° C. is employed as the firing temperature, a dehydration reaction of the chemical thermal storage medium particles 12 can be promoted, structuring (hardening) the chemical thermal storage medium particles 12 and the sepiolite 16. Micro-cracks are formed in the chemical thermal storage medium particles 12 due to the firing temperature of 400° C. to 500° C., and therefore in the manufacturing method of the chemical thermal storage medium composite molded bodies 11, the chemical thermal storage medium particles 12 can be organized and structured at the same time as increasing the relative surface area thereof.

Note that the firing temperature to generate micro-cracks in the chemical thermal storage medium particles 12, when formed from calcium hydroxide, is most preferably about 450° C. It has been found that when the firing temperature is 400° C. or below occurrence of micro-cracks is infrequent, and when 500° C. or above, the chance of the chemical thermal storage medium particles 12 breaking is increased, and the relative surface area of the chemical thermal storage medium particles 12 decreases due to sintering. Note that with regard to the temperature ranges for other substances than calcium hydroxide, for example magnesium oxide (the product of dehydrating magnesium hydroxide), a firing temperature can also be employed that induces micro-cracks. Note that the dehydration temperature of magnesium hydroxide is different depending on the atmospheric water vapor pressure, however it is slightly lower than the dehydration temperature of calcium hydroxide (about 350° C. to 400° C.).

Note that while in the above exemplary embodiment an example in which sepiolite, a clay mineral having a layered ribbon structure, is employed as a clay mineral, the present invention is not limited thereto, and, for example, palygorskite (attapulgite), which is a clay mineral having a layered ribbon structure, may be employed, or a bentonite, which does not belong to clay minerals having a layered ribbon structure, may be employed. Note that, in further explanation regarding bentonite, bentonite is a clay mineral with comparatively strong binding force in comparison to clay minerals having a layered ribbon structure, and a rigid porous structure can be obtained, with this further contributing, for example, to raising the bonding strength to metal walls. In the chemical thermal storage medium composite molded bodies 11 utilizing bentonite too, a porous structural body is formed with the pores 14 formed between the plural chemical thermal storage medium particles 12. However, when clay minerals having a layered ribbon structure are used, there is the advantage, that there is less sintering (densification) in comparison to bentonite. In particular, sepiolite has the advantage of sintering at a temperature close to the dehydration temperature (the temperature for inducing micro-cracks) of the chemical thermal storage medium particles 12 in the manner described above, there is little reduction in relative surface area due to sintering (the relative surface area increase due to micro-cracks is exceeds such an amount). The clay mineral employed in manufacturing the chemical thermal storage medium composite molded bodies 11 may be determined in consideration of these advantages depending, for example, on the application and the like.

Furthermore, in the above exemplary embodiment, an example is given in which calcium hydroxide ($Ca(OH)_2$) is employed as a hydrated chemical thermal storage medium for the chemical thermal storage medium particles 12, however the present invention is not limited thereto. For example, magnesium hydroxide ($Mg(OH)_2$), which is an alkaline earth metal inorganic compound, may be used as the chemical thermal storage medium particles 12. Similarly, $Ba(OH)_2$ and $Ba(OH)_2.H_2O$, which are alkaline earth metal inorganic compounds, may be used as the chemical thermal storage medium particles 12, and inorganic compounds other than alkaline earth metal inorganic compounds, such as, for example, $LiOH \cdot H_2O$, and $Al_2O_3 \cdot 3H_2O$, or the like, may be used as the chemical thermal storage medium particles 12. Furthermore, in place of hydration type chemical thermal storage medium particles 12 that store heat and dissipating heat by hydration and dehydration reactions, chemical thermal storage medium particles 12 may be employed that utilized another reaction.

Furthermore, in the exemplary embodiment described above, an example is given in which the chemical thermal storage medium composite molded bodies 11 have plural flow channels 15, however the present invention is not limited thereto. The heat exchanger heat-utilization device 10 may be configured employing chemical thermal storage medium composite molded body 11 that has a single flow channel 15, depending on the dimensions and shape of the heat exchanger heat-utilization device 10 and according to the heat transfer (heat storage) capability required.

Further still, the flow channels formed in the chemical thermal storage medium composite molded bodies 11 are not limited to the flow channels 15 that pass through the chemical thermal storage medium composite molded bodies 11 in the water vapor flow direction, and it is possible to set one or more of the flow channels as the inter-particle spacing of the chemical thermal storage medium particles 12, having a flow channel cross-section that is larger than the pores 14. For example, the chemical thermal storage medium particles 12 may be organized and structured to form particulate shape primary particles, and then plural of the primary particles further organized and structured into secondary particles, the secondary particles formed with larger flow channels (gaps) larger than the pores 14 in the primary particles, and the heat exchanger heat-utilization device 10 configured employing the secondary particles.

Furthermore, in the exemplary embodiment described above, an example has been given where, during heat storage and heat dissipation of the chemical thermal storage medium composite molded bodies 11, the chemical thermal storage medium composite molded bodies 11 perform heat exchange to a fluid flowing in the fluid flow channels 26, however the present invention is not limited thereto. For example, configuration can be made in which a heat storage reaction is induced in the chemical thermal storage medium composite molded bodies 11 by a high temperature gas flowing in the thermal storage medium containing portions 25 (flow channels 15). Such a configuration can, for example, be applied in a configuration employing heat from a heat source that is released to the atmosphere, such as exhaust gas or the like.

Figure 4:
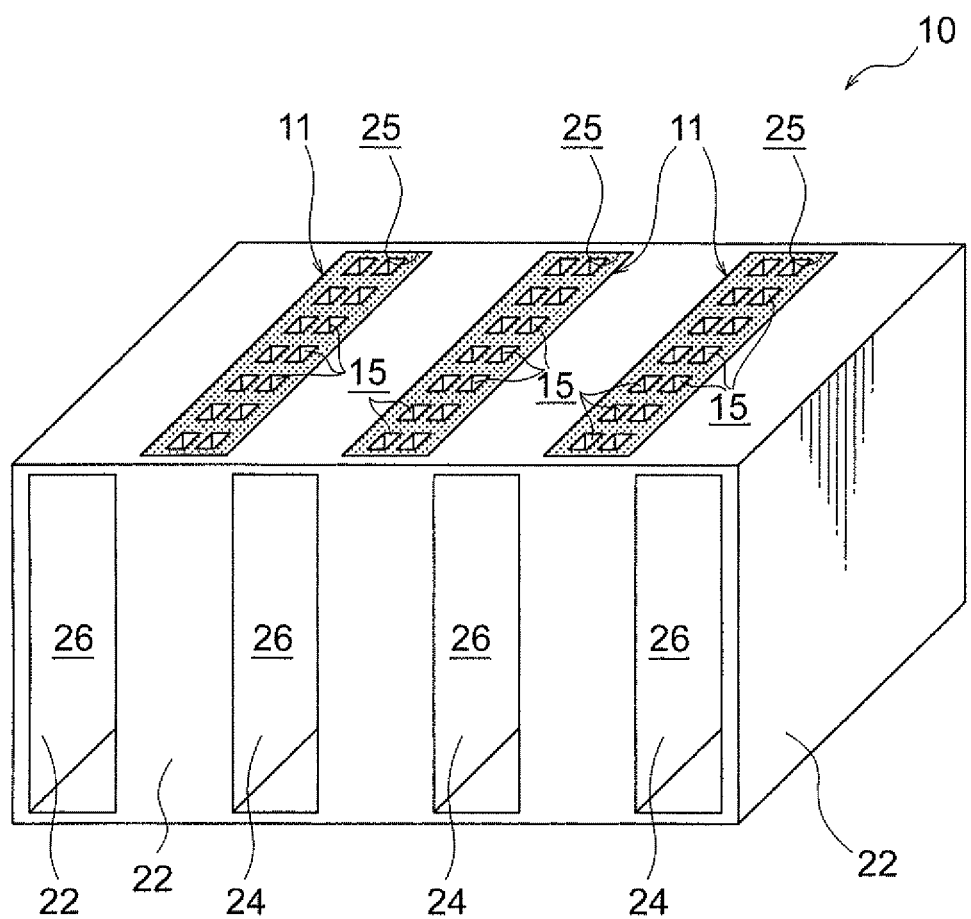
FIG. 4 is a perspective view schematically showing a heat exchanger heat-utilization device according to a modified example of an exemplary embodiment of the present invention.

Furthermore, in the exemplary embodiment described above (FIG. 1), an example is shown with the thermal storage medium containing portions 25 and the fluid flow channels 26 in the heat exchanger body 20 having opening directions that are the same, in an opposing flow or parallel flow design of heat exchanger body 20. However, for example, as shown in FIG. 4, the heat exchanger heat-utilization device 10 may be configured employing a cross-flow design of the heat exchanger body 20.

The invention claimed is:

1. A heat exchanger heat-utilization device comprising:
   an outer wall;
   a plurality of partition walls that partition an inside portion of the heat exchanger heat-utilization device surrounded by the outer wall into a plurality of thermal storage medium containing cavities and a plurality of fluid flow channels, wherein each of the thermal storage medium containing cavities is disposed adjacent to a fluid flow channel and a fluid flow channel is disposed at both sides of each of the thermal storage medium containing cavities in the planar cross-section direction; and
   a plurality of chemical thermal storage medium composite molded bodies that are sintered porous structural bodies formed of chemical thermal storage medium particles dispersed and held in a skeleton of a clay mineral, wherein:
      each of the plurality of chemical thermal storage medium composite molded bodies is accommodated within one of the plurality of thermal storage medium containing cavities, and
      each of the chemical thermal storage medium composite molded bodies contains a plurality of flow channels configured to supply a reactant to the corresponding chemical thermal storage medium composite molded body or to discharge a reaction product therefrom.

2. The heat exchanger heat-utilization device of claim 1, wherein each of the plurality of flow channels contained by each of the chemical thermal storage medium composite bodies has one fluid flow direction end opening at a surface of the corresponding chemical thermal storage medium composite molded body.

3. The heat exchanger heat-utilization device of claim 1, wherein the clay mineral is a clay mineral having a layered ribbon structure.

4. The heat exchanger heat-utilization device of claim 3, wherein the clay mineral having the layered ribbon structure is sepiolite or palygorskite.

5. The heat exchanger heat-utilization device of claim 1, wherein the clay mineral is bentonite.

6. The heat exchanger heat-utilization device of claim 1, wherein the clay mineral is in a fibrous state with fibers of the clay mineral having diameters finer than a size of the chemical thermal storage medium particles.

7. The heat exchanger heat-utilization device of claim 1, wherein the chemical thermal storage medium molded bodies have micro-cracks therein.

8. The heat exchanger heat-utilization device of claim 1, wherein the chemical thermal storage medium particles are particles of a hydration reaction chemical thermal storage medium configured to absorb heat during a dehydration reaction and dissipate heat during a hydration reaction.

9. The heat exchanger heat-utilization device of claim 1, wherein the chemical thermal storage medium particles are particles of a hydration reaction chemical thermal storage medium configured to oxidize during a dehydration reaction and hydroxylate during a hydration reaction.

10. The heat exchanger heat-utilization device of claim 9, wherein the hydration reaction chemical thermal storage medium is an inorganic compound.

11. The heat exchanger heat-utilization device of claim 10, wherein the inorganic compound is an alkali earth metal compound.

12. The heat exchanger heat-utilization device of claim 1, wherein a content of the clay mineral relative to the chemical thermal storage medium particles in the chemical thermal storage medium molded bodies is about 5 to 10% by weight.

13. The heat exchanger heat-utilization device of claim 1, wherein an external surface of each of the chemical thermal storage medium composite molded bodies is adhered to an inside surface of the partition wall defining the corresponding thermal storage medium containing cavity.

14. A method of manufacturing a heat exchanger heat-utilization device, the method comprising:
   forming a plurality of chemical thermal storage medium composite molded bodies by molding a mixed and kneaded product of chemical thermal storage medium particles and a clay mineral, wherein each of the chemical thermal storage medium composite molded bodies contains a plurality of flow channels;

inserting each of the plurality of chemical thermal storage medium composite molded bodies into one of a plurality of thermal storage medium containing cavities of a heat exchanger structural body; and sintering the plurality of chemical thermal storage medium composite molded bodies while still inserted into the plurality of thermal storage medium containing cavities of the heat exchanger structural body, wherein the heat exchanger structural body comprises:
an outer wall, and
a plurality of partition walls that partition an inside portion of the heat exchanger structural body surrounded by the outer wall into the plurality of thermal storage medium containing cavities and a plurality of fluid flow channels, wherein each of the thermal storage medium containing cavities is disposed adjacent to a fluid flow channel, and a fluid flow channel is disposed at both sides of each of the thermal storage medium containing cavities in the planar cross-section direction.

15. The method of manufacturing a heat exchanger heat-utilization device of claim 14, wherein the clay mineral is a clay mineral having a layered ribbon structure.

16. The method of manufacturing a heat exchanger heat-utilization device of claim 15, wherein the clay mineral having a layered ribbon structure is sepiolite or palygorskite.

17. The method of manufacturing a heat exchanger heat-utilization device of claim 14, wherein the clay mineral is bentonite.

18. The method of manufacturing a heat exchanger heat-utilization device of claim 14, wherein the clay mineral is in a fibrous state with fibers of the clay mineral having diameters finer than a size of the chemical thermal storage medium particles.

19. The method of manufacturing a heat exchanger heat-utilization device of claim 14, wherein the chemical thermal storage medium particles are particles of a hydration reaction chemical thermal storage medium that absorbs heat during a dehydration reaction and dissipates heat during a hydration reaction, and the particles are mixed and kneaded in a hydrated state with the clay mineral.

20. The method of manufacturing a heat exchanger heat-utilization device of claim 14, wherein the chemical thermal storage medium particles are particles of a hydration reaction chemical thermal storage medium that oxidizes during a dehydration reaction and hydroxylates during a hydration reaction, and the particles are mixed and kneaded in a hydroxide state with the clay mineral.

21. The method of manufacturing a heat exchanger heat-utilization device of claim 20, wherein the hydration reaction chemical thermal storage medium is an inorganic compound.

22. The method of manufacturing a heat exchanger heat-utilization device of claim 21, wherein the inorganic compound is an alkali earth metal compound.

23. The method of manufacturing a heat exchanger heat-utilization device of claim 20, wherein the sintering of the plurality of chemical thermal storage medium composite molded bodies results in the particles of the hydration reaction chemical thermal storage medium being in a dehydrated state.

24. The method of manufacturing a heat exchanger heat-utilization device of claim 23, wherein the sintering of the plurality of chemical thermal storage medium composite molded bodies comprises firing at a temperature at which micro-cracks are formed in the plurality of chemical thermal storage medium molded bodies.

* * * * *